United States Patent
Kast

[11] 3,770,128
[45] Nov. 6, 1973

[54] DEVICE FOR TREATING AQUARIUM WATER

[76] Inventor: Mark D. Kast, 2423 Forest Park Blvd., Ft. Wayne, Ind. 46805

[22] Filed: Feb. 23, 1972

[21] Appl. No.: 228,525

[52] U.S. Cl. .............................. 210/169, 210/220
[51] Int. Cl. ............................................. E04h 3/20
[58] Field of Search ................. 210/65, 68, 73, 169, 210/220

[56] References Cited
UNITED STATES PATENTS

| | | | |
|---|---|---|---|
| 3,360,129 | 12/1967 | Powers............................... | 210/169 |
| 3,490,416 | 1/1970 | Kelley et al...................... | 210/169 X |
| 2,782,161 | 2/1957 | Willinger et al. ................. | 210/169 |

*Primary Examiner*—Samih N. Zaharna
*Assistant Examiner*—Ivars Cintins
*Attorney*—Albert L. Jeffers et al.

[57] ABSTRACT

A device for inserting in an aquarium for the treatment of the water in the aquarium including filtration of the water, circulation of the water and aeration of the water as well as the selective supply of treatment materials to the water. A plurality of individual screen elements are arranged in vertical alignment and progressively decrease in mesh size in the upper direction and a fluid jet is directed upwardly toward the bottom of the lowermost screen element. The fluid jet, which may be air, flows upwardly through the screen elements and induces flow of aquarium water upwardly through the screen element whereby particulate material in the aquarium water will be filtered out and deposit on the bottoms of the screen elements. The water in the aquarium has free access to the underside of all of the screen elements and particles in the aquarium water, if small enough to pass through a lower, larger mesh screen element will be filtered out from the water in an upper, finer mesh screen element. The device according to the present invention is preferably in the form of a single unit which can be placed in submerged location in an aquarium, preferably centrally of a longer wall thereof and effects continuous cleaning and circulation of the aquarium water. The individual screen elements are advantageously contained within individual housing members and a screened cap is provided for one of the housing members so that it can be mounted on one end thereof and charcoal or a treatment medium, such as a soluble chemical material, can be placed between the screened cap and the screen element in the respective housing and thereby effect treatment of the aquarium water as flow thereof is induced through the respective screen element.

7 Claims, 8 Drawing Figures

PATENTED NOV 6 1973　　　　　　　　　　　　　　　　　　3,770,128
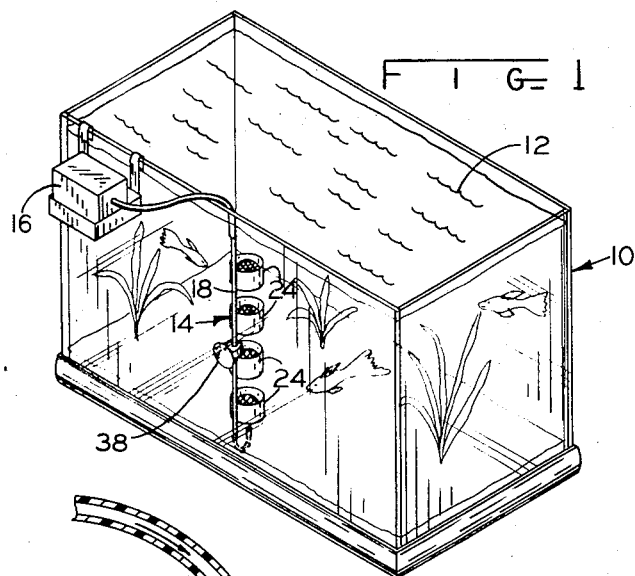
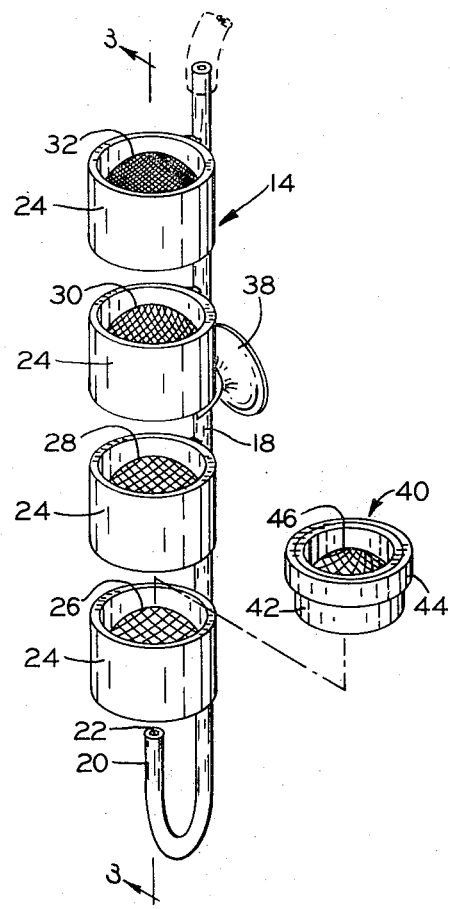
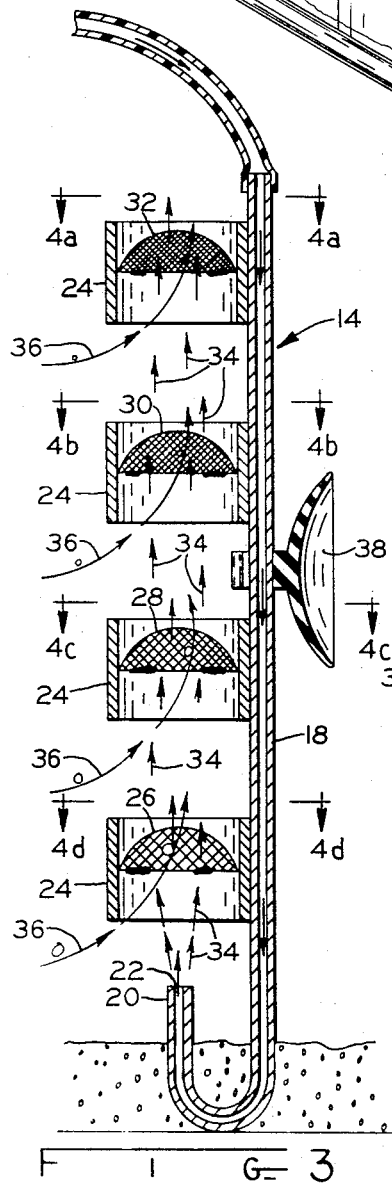
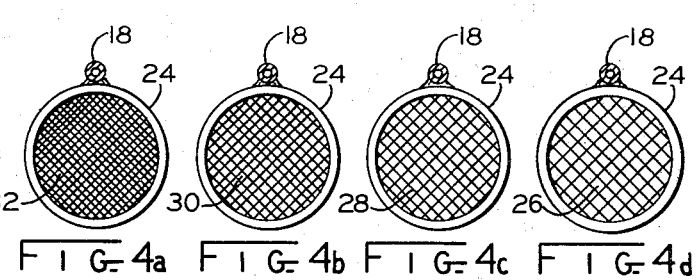
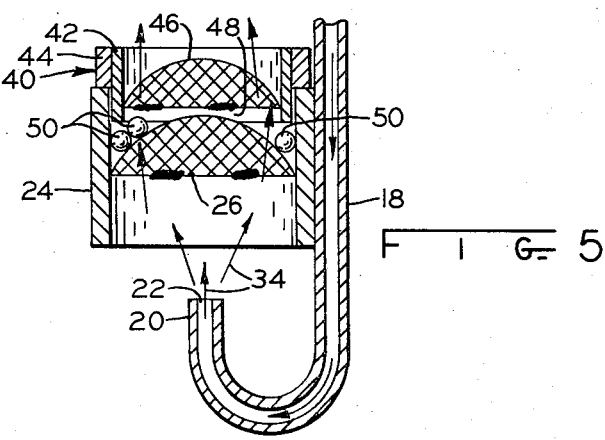

DEVICE FOR TREATING AQUARIUM WATER

The present invention relates to a device for the treatment of aquarium water and is particularly concerned with a novel arrangement of this nature which will effect circulation and filtration of the aquarium water and by means of which the aquarium water can be aerated and treatment material supplied thereto.

Aquarium, particularly of the smaller type, which are commonly found in residences, must be kept clean and in balance with respect to the water in the aquarium in order to provide healthful conditions for the fish. The cleaning of the aquarium water, and the aeration thereof, is particularly important to prevent solid fish waste and material, such as uncomsumed food particles, from causing the aquarium water to become foul. It is also extremely important to maintain oxygen in the water, particularly if the aquarium is not provided with sufficient living plants to maintain an oxygen supply to the aquarium water.

The many filtration and aeration devices known for use with aquariums generally take the form of a container in which activated charcoal and a fibrous filtration medium, such as glass wool, or the like, is placed with a circulating arrangement being provided for drawing water off from the aquarium and passing it through the filtering medium and the activated charcoal. Such devices may or may not supply air to the water in the aquarium. If no air is supplied to the water, then the aquarium must have an adequate amount of living plants therein or some other source of air must be provided in order to oxygenate the air in an amount sufficient to produce the proper environment for the fish in the aquarium.

Filters of the above referred to type are effective for filtration of water but must be cleaned frequently and the cleaning of the filter of this type is a rather messy job. Further, such a filter must be recharged with more activated charcoal and filtering medium after it is cleaned.

With the foregoing in mind, a primary objective of the present invention is the provision of an improved device for use with aquariums of the nature referred to for treatment of the water in the aquarium to maintain the water in good condition to provide a satisfactory environment for the fish in the aquarium.

Another object of the present invention is the provision of a device for the treatment of aquarium water which does not employ charcoal or a filtering medium, such as glass wool or the like.

Still another object of the present invention is the provision of a device for the treatment of water in the aquarium which is relatively inexpensive to manufacture.

Still another object of the present invention is the provision of a simple device for the treatment of water in the aquarium which is highly efficient in operation.

BRIEF SUMMARY OF THE INVENTION

According to the present invention, a plurality of screen elements are arranged in spaced vertical relation in a submerged location within an aquarium with the water in the aquarium having free access to the undersides of the screen elements. A conduit is arranged to discharge in the upward direction beneath the lowermost one of the screen elements so that a jet of fluid issuing from the conduit will pass upwardly through the screen elements, thereby inducing flow of the aquarium water upwardly through the screen elements and, in this manner, filtering particulate material out from the aquarium water. The screen elements progressively decrease in mesh in the upward direction so that larger particles are entrapped in the lower screen elements and particles fine enough to pass through the lower and coarser mesh screen elements will be entrapped in the upper finer mesh screen elements.

The fluid supplied by the conduit may be water under pressure but is advantageously air so that the aquarium water is aerated and is also induced to flow through the screen element, thereby to be filtered and caused to circulate within the aquarium.

The individual screen elements are preferably concave downwardly and are mounted in individual housing elements with the housing elements advantageously being attached to a vertically extending tube through which the fluid is supplied to the underneath side of the lowermost element. The device is adapted to be disposed within an aquarium in a vertical position and may carry one or more suction cups so that it can be mounted on the inside of a wall of aquarium.

Still another object of the present invention is the provision of a device for the treatment of water in the aquarium which is quite simple to clean at any time.

The objects referred to above, as well as still other objects and advantages, of the present invention will become more apparent upon reference to the following detailed specification taken in connection with the accompanying drawings in which:

FIG. 1 is a perspective view showing the manner in which a device of the present invention is mounted in a typical aquarium.

FIG. 2 is a somewhat perspective view drawn at a somewhat enlarged scale, showing the device of the present invention.

FIG. 3 is a vertical sectional view through the device and is indicated by line 3—3 on FIG. 2.

FIGS. 4a, 4b, 4c and 4d are plan sectional views indicated by lines 4a, 4b, 4c and 4d on FIG. 3.

FIG. 5 is a sectional view through a portion of the device, showing the manner in which treatment material, such as soluble capsules can be contained within the device for treating the aquarium water.

DETAILED DESCRIPTION OF THE INVENTION

Referring to the drawings somwhat more in detail, an aquarium of a typical type is generally indicated at 10. The aquarium contains water 12 and mounted in vertically disposed relation in submerged condition in the water 12 is device 14, according to the present invention. Device 14 in FIG. 1 is supplied with fluid under pressure by component 16, which may be a pump for circulating water to the device, or which may be, advantageously, a typical aquarium air pump.

As will best be seen in FIGS. 2 and 3, the device comprises a substantially rigid conduit or tube 18, extending downwardly along the device and having the lower end thereof turned up as at 20 and having an outlet opening 22 from which a jet of fluid, preferably air, is supplied. Arranged in spaced relation along conduit 18 are cylindrical housing members 24, which may be, for example, about an inch and a quarter inside diameter and somewhat on the order of about an inch in length. These housing members may be formed of a water resistant plastic material or a metal material, such as stainless steel.

Mounted in each housing member is a respective screen element. In FIG. 3, the screen elements are indicated at 26, 28, 30 and 32. These screen elements are concave downwardly, as by being conical or domed, and decrease in mesh size in the upward direction so that the lowermost screen element 26 has the largest holes therein and the uppermost screen element 32 has the smallest holes therein. The screen elements are engaged about the peripheries thereof by the housing members 24 so that fluid flowing upwardly through the device must pass through the respective screen elements.

When air is supplied, the air will be broken up by the screen elements but will move in the vertical direction and after leaving one screen element will be captured by the next and pass therethrough in the upward direction, as indicated by arrows 34 in FIG. 3. This upward movement of the fluid through the screen elements induces the flow of aquarium water upwardly through the screen elements as indicated by arrows 36 in FIG. 3. It will at once be apparent that upward movement of air through the device from beneath the lowermost one of the screen elements to the surface of the water in the aquarium will bring about circulation of the aquarium water and will aerate the water and will furthermore cause particulate material in the aquarium water to deposit out on the undersides of the screen elements.

The device can have a base member thereon to support it on the floor of the aquarium but advantageously has one or more suction cup members 38 which may be mounted on tube or conduit 18 and provide the means for mounting the device inside of an aquarium wall. Advantageously, the device is mounted in about the middle of one of the walls of the aquarium, as shown in FIG. 1, so as to obtain the most beneficial circulation and seration of the water in the aquarium.

The reduction in mesh size from the bottom screen element to the top screen element is schematically illustrated in FIGS. 4a, 4b, 4c and 4d, which are views looking down on top of the respective screen elements, starting with the uppermost one thereof.

The screen elements are mounted in their respective housing members so that the peripheries of the screen elements are located at about the axial center of the respective housing members and because of this it is possible to utilize at least one of the housing members in a manner illustrated in FIG. 5. In FIG. 5, a cap 40 is provided, which may consist of an inner ring 42 and outer ring 44 and a concave screen member 46 having the periphery thereof captive between the rings and extending over the open end of the cap.

The described arrangement of cap 40 permits it to be telescopically mounted on one end of one of the housing members 24, for example, the lowermost one thereof so as to provide a space 48 therein in which treatment material, such as the capsules 50, can be placed for dissolving in the aquarium water passing upwardly through the housing member. The space 48 could, of course, contain activated charcoal or a filter medium or the like but, in general, the space will find its greatest utility for receiving capsules which will slowly dissolve in the aquarium water and thereby supply a treatment agent thereto.

In practice, only a small amount of air pressure need be supplied to tube or conduit 18 and, as explained, this will not only provide for aeration of the aquarium water but the circulation of the aquarium water through the screen elements. The air may accummulate to a certain degree underneath at least the finer mesh screen elements, but when adequate pressure is built up the air will pass through the respective screen elements on upwardly toward the surface of the water.

The device can readily be cleaned at any time by merely lifting it from the aquarium and washing the screen elements off with a flow of water from above.

The device is quite compact and does not interfere with the movement of the fish, or with the growth of plants in the aquarium and no material, such as glass fibers or carbon is required for the device to be fully operative for its intended purpose.

Fish do not become caught in the filter because the construction of the filter prevents this from occurring.

The present device, according to the invention, is quite inexpensive to construct and will operate efficiently even with a small air pump supplying air to the space beneath the lowermost one of the screen elements.

It will be appreciated that modifications may be made without department from the purview of the present invention. For example, the housing members 24 could be combined in a single unit with access holes in the side to permit water from the aquarium to enter the space between the screens, or the supporting housing members 24 could merely be in the form of wire loops engaging the downwardly concave screen elements at the peripheries thereof and secured in some simple manner to the conduit or tube 18.

Modifications within the purview of the appended claims would occur to those skilled in the art. What is claimed is:

1. In a device for use in a treatment of water in an aquarium comprising, in combination, a number of laterally extending screen elements in vertically spaced close relationship to each other, said screen elements being progressively finer mesh in the upward direction, conduit means for transferring fluid to cause aquarium water to flow upwardly through said screen elements, said conduit means including an outlet disposed beneath said screen elements for dicharging fluid upwardly to provide vertical flow through the screen elements with simultaneous flow of aquarium water upwardly through the screen elements, and housing means carried by said conduit means means for maintaining the screen elements in vertical alignment with respect to each other so that the flow of fluid will pass through each screen element.

2. A device according to claim 1 in which said housing means comprises a respective housing member for each screen element, said housing members being disposed in vertically spaced aligned relation and each supportingly engaging the periphery of a respective screen element.

3. A device according to claim 1 in which said housing means comprises a respective housing member for each screen element, said housing members being disposed in vertically spaced aligned relation and each supportingly engaging the periphery of a respective screen element, said conduit means comprising a substantially rigid tube extending axially along said housing members and connected in supporting relation thereto to form a unit therewith.

4. A device according to claim 1 which includes suction cup means carried by said conduit means for connection of the device to an inside wall of an equarium.

5. A device according to claim 1 in which each said screen element is concave in the downward direction.

6. A device according to claim 1 in which each said screen element is concave in the downward direction, said conduit means extending vertically downwardly along said support means and having the lower end bent upwardly beneath the lowermost one of said screen elements and the upper end of said conduit means being adapted for connection to a supply of air under pressure.

7. A device according to claim 1 in which said housing means comprises a respective housing member for each screen element, said housing members being disposed in vertically spaced aligned relation and each supportingly engaging the periphery of a respective screen element, each screen element having the periphery thereof connected to the respective housing member about midway between the top and bottom of the housing member, and a screened cap adapted for mounting on one end of at least one said housing member for confining water treatment material in the respective housing member between the screen element therein and the screened cap.

* * * * *

UNITED STATES PATENT OFFICE
CERTIFICATE OF CORRECTION

Patent No. 3,770,128              Dated Nov. 6, 1973

Inventor(s) Mark D. Kast

It is certified that error appears in the above-identified patent and that said Letters Patent are hereby corrected as shown below:

Col. 2, line 23, "the" omitted between "of" and "aquarium"

Col. 4, line 37 (Claim 1) "a" second occurrence, should be --- the ---.

Col. 5, line 3 (Claim 4) "equarium" should be --- aquarium ---.

Signed and sealed this 16th day of April 1974.

(SEAL)
Attest:

EDWARD M. FLETCHER, JR.          C. MARSHALL DANN
Attesting Officer                Commissioner of Patents